(12) United States Patent
Nishikawa et al.

(10) Patent No.: US 9,358,965 B2
(45) Date of Patent: Jun. 7, 2016

(54) BRAKING DEVICE FOR MOTORCYCLE

(75) Inventors: Yutaka Nishikawa, Saitama (JP); Kazuya Takenouchi, Saitama (JP); Takehiko Nanri, Saitama (JP); Kazuhiko Tani, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 684 days.

(21) Appl. No.: 12/842,222

(22) Filed: Jul. 23, 2010

(65) Prior Publication Data

US 2011/0024249 A1 Feb. 3, 2011

(30) Foreign Application Priority Data

Jul. 31, 2009 (JP) ................................. 2009-179555

(51) Int. Cl.

| B60T 13/00 | (2006.01) |
|---|---|
| B60T 8/32 | (2006.01) |
| B60T 7/04 | (2006.01) |
| B60T 7/08 | (2006.01) |
| B60T 8/17 | (2006.01) |
| B60T 8/26 | (2006.01) |
| B60T 8/40 | (2006.01) |
| B60T 8/50 | (2006.01) |

(52) U.S. Cl.
CPC ............... *B60T 8/3225* (2013.01); *B60T 7/042* (2013.01); *B60T 7/085* (2013.01); *B60T 8/1706* (2013.01); *B60T 8/261* (2013.01); *B60T 8/4081* (2013.01); *B60T 8/5006* (2013.01)

(58) Field of Classification Search
CPC ............. B60T 8/00; B60T 8/17; B60T 8/171; B60T 8/172; B60T 8/26; B60T 2220/00; B60T 2270/00; B60T 8/3225; B60T 8/1706; B60T 8/261; B60T 8/4081; B60T 8/5006; B60T 7/042; B60T 7/085

USPC ............ 303/3, 9.61, 9.62, 9.64, 15, 137, 191
See application file for complete search history.

(56) References Cited

U.S. PATENT DOCUMENTS

| 5,219,211 | A | * | 6/1993 | Tsuchida et al. ............. 303/9.64 |
|---|---|---|---|---|
| 6,273,523 | B1 | | 8/2001 | Wakabayashi et al. |
| 6,409,285 | B1 | * | 6/2002 | Wakabayashi et al. ...... 303/9.64 |
| 2005/0067892 | A9 | * | 3/2005 | Heubner et al. ........... 303/113.5 |
| 2006/0138857 | A1 | * | 6/2006 | Nakayama et al. ................ 303/3 |
| 2006/0138858 | A1 | * | 6/2006 | Nakayama et al. .......... 303/9.64 |

FOREIGN PATENT DOCUMENTS

| JP | 11-005580 | 1/1999 |
|---|---|---|
| JP | 2006-062559 A | 3/2006 |
| JP | 2008-207682 A | 9/2008 |

* cited by examiner

*Primary Examiner* — Melody Burch
(74) *Attorney, Agent, or Firm* — Birch, Stewart, Kolasch & Birch, LLP

(57) ABSTRACT

A braking device for the motorcycle is configured to permit actuation control in an interlocking manner of a rear-wheel brake caliper and a front-wheel brake caliper based on an operation of a brake pedal. The braking device includes a hydraulic pressure detector for detecting rear-wheel brake hydraulic pressure caused by the operation of the brake pedal; a determining portion that determines whether or not a detected value by the hydraulic pressure detector is a predetermined value or more; and a hydraulic pressure controller that, when it is determined by the determining portion that the detected value is the predetermined value or more, changes a rising rate of the rear-wheel brake hydraulic pressure to a value lower than a rising rate during a period until the time when the rear-wheel brake hydraulic pressure reaches the predetermined value to control the rear-wheel brake hydraulic pressure, and also controls front-wheel brake hydraulic pressure.

11 Claims, 4 Drawing Sheets

BRAKING DEVICE FOR MOTORCYCLE

CROSS-REFERENCE TO RELATED APPLICATIONS

The present application claims priority under 35 USC 119 to Japanese Patent Application No. 2009-179555 filed on Jul. 31, 2009 the entire contents of which are hereby incorporated by reference.

BACKGROUND OF THE INVENTION

1. Field of the Invention

The present invention relates to a braking device for a motorcycle allowing interlocking control between a rear-wheel brake and a front-wheel brake based on an operation of a rear-wheel brake operating unit.

2. Description of Background Art

A braking device for a motorcycle is known with an interlocking brake system (CBS: Combined Brake System) wherein when a brake operating unit (such as a brake lever or a brake pedal) on either of the front and rear wheels is operated, hydraulic pressure is allowed to act on a brake of the wheel on the operated side, and in response thereto, a predetermined hydraulic pressure is allowed to act also on a brake of the wheel on the unoperated side.

For example, JP-A No. H11-5580 discloses a device for controlling distribution of a braking force between a front-wheel brake and a rear-wheel brake, in a braking device for a motorcycle adopting the interlocking brake system.

However, in some braking devices adopting the interlocking brake system, when a rear-wheel brake is actuated by operation of a brake pedal, and in response thereto, a front-wheel brake is also actuated, a large braking force is applied to the vehicle depending upon operating conditions or the like. In particular, since a brake pedal is operated normally by pushing with a foot, delicate control is difficult, which might lead to an unintentional abrupt operation.

On the other hand, even when, in order to address the above-described problem, optimization of the specifications for an input mechanism of the brake pedal or the physical specifications for a front-wheel brake is performed, change of parts or the like is required for every vehicle type, which might cause increases in manufacturing man-hours and in cost.

SUMMARY AND OBJECTS OF THE INVENTION

Accordingly, the present invention has been made in view of the above-described related art problems. According to an embodiment of the present invention, a braking device for a motorcycle is provided wherein a more smooth and natural brake operation feeling can be obtained and the manufacturing costs can be reduced, even in the motorcycle equipped with an interlocking brake system.

According to an embodiment of the present invention, a braking device for a motorcycle allows an interlocking control of a rear-wheel brake (18) and a front-wheel brake (16) based on an operation of a rear-wheel brake operating unit (14) and includes a hydraulic pressure detector (70) that detects a rear-wheel brake hydraulic pressure caused by the operation of the rear-wheel brake operating unit; a determining portion (72) that determines whether or not a detected value by the hydraulic pressure detector is a predetermined value or more; and a hydraulic pressure controller (68) that, when it is determined by the determining portion that the detected value is the predetermined value or more, changes a rising rate of the rear-wheel brake hydraulic pressure to a value lower than a rising rate during a period until the time when the rear-wheel brake hydraulic pressure reaches the predetermined value to control the rear-wheel brake hydraulic pressure, and also controls front-wheel brake hydraulic pressure in accordance with a hydraulic pressure set based on the rising rate of the rear-wheel brake hydraulic pressure after changing. Here, reference signs in parentheses are included herein corresponding to reference numerals in the accompanying drawings, however the inclusion of the reference signs is merely for facilitating an understanding of the invention and should not be construed as limiting the scope of the invention. The same is applied hereinafter.

According to an embodiment of the present invention, the hydraulic pressure controller executes control for reducing a rising rate of the front-wheel brake hydraulic pressure when it is determined by the determining portion that the rising rate of the rear-wheel brake hydraulic pressure is the predetermined value or more.

According to an embodiment of the present invention, the hydraulic pressure controller controls the front-wheel brake hydraulic pressure in such a manner that the front-wheel brake hydraulic pressure does not exceed a front-wheel lock hydraulic pressure.

According to an embodiment of the present invention, a rising rate of the front-wheel brake hydraulic pressure to be controlled in the case where it is determined by the determining portion that the rising rate of the rear-wheel brake hydraulic pressure is the predetermined value or more, is set to be lower than the rising rate of the rear-wheel brake hydraulic pressure.

According to an embodiment of the present invention, when it is determined by the determining portion that the rising rate of the rear-wheel brake hydraulic pressure is the predetermined value or more, the front-wheel brake hydraulic pressure set based on the rising rate of the rear-wheel brake hydraulic pressure is prestored as a function or a map.

According to an embodiment of the present invention, a front-wheel locking state is detected by a wheel speed sensor, and according to a brake hydraulic pressure in that state, the front-wheel lock hydraulic pressure is set.

According to an embodiment of the present invention, the rear-wheel brake operating unit is a brake pedal.

According to an embodiment of the present invention, in the braking device for the motorcycle allowing interlocking control of the rear-wheel brake and the front-wheel brake based on an operation of the rear-wheel brake operating unit, it is determined whether or not a detected value by the hydraulic pressure detector for detecting rear-wheel brake hydraulic pressure is a predetermined value or more. In addition, when it is determined that the detected value is the predetermined value or more, a rising rate of the rear-wheel brake hydraulic pressure is changed and controlled to a value lower than a rising rate during a period until the time when the rear-wheel brake hydraulic pressure reaches the predetermined value. In addition, the front-wheel brake hydraulic pressure is also controlled in accordance with a hydraulic pressure set based on the rising rate of the rear-wheel brake hydraulic pressure after changing.

Furthermore, according to an embodiment of the present invention, when it is determined by the determining portion that the rising rate of the rear-wheel brake hydraulic pressure is the predetermined value or more, control for reducing a rising rate of the front-wheel brake hydraulic pressure is executed.

Therefore, for example, even in the case where the rear-wheel brake operating unit made up of the brake pedal is sharply operated or the like, the rising of the front-wheel brake caliper pressure is restricted, which leads to a more smooth and natural brake operation performance. Furthermore, the braking device may be mounted on various kinds of motorcycles by only changing the settings of control programs of the ECU without changing specifications (such as a master cylinder or pedal ratio) for an input mechanism of the rear-wheel brake operating unit, specifications for various kinds of brake parts or the like, which previously required the settings depending on the type of vehicle. Thus, the braking device, which is simple and has great versatility, can readily respond to differences in product models, changes in specifications or the like by only changing to optimize control specification, and also allows the reduction in setting man-hours and in costs for mounting.

According to an embodiment of the present invention, the front-wheel brake hydraulic pressure is controlled so as not to exceed the front-wheel lock hydraulic pressure, thereby allowing minimization of wheel locking and further improvement of brake control performance.

According to an embodiment of the present invention, the rising rate of the front-wheel brake hydraulic pressure to be controlled based on the rising rate of the rear-wheel brake hydraulic pressure is set to be lower than the rising rate of the rear-wheel brake hydraulic pressure. Therefore, a more smooth and natural brake operation performance may be obtained.

According to an embodiment of the present invention, the front-wheel brake hydraulic pressure set based on the rising rate of the rear-wheel brake hydraulic pressure is prestored as a function or a map, thereby allowing reduction of arithmetic processing by the hydraulic pressure controller and a more smooth control of the front-wheel brake caliper pressure.

According to an embodiment of the present invention, a front-wheel locking state is detected by the wheel speed sensor, and according to a brake hydraulic pressure in that state, the front-wheel lock hydraulic pressure is set, thereby allowing control of the front-wheel brake hydraulic pressure more suitable for a vehicle state during braking.

According to an embodiment of the present invention, even in the case where the rear-wheel brake operating unit is a brake pedal which tends to make delicate brake control difficult relative to the case of a hand brake, more smooth and natural brake operation performance may be obtained by the execution of a control of the rising rate of the front-wheel brake hydraulic pressure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a braking device for a motorcycle according to the present invention will be described in detail with reference to a preferred embodiment and the accompanying drawings.

Figure 1:
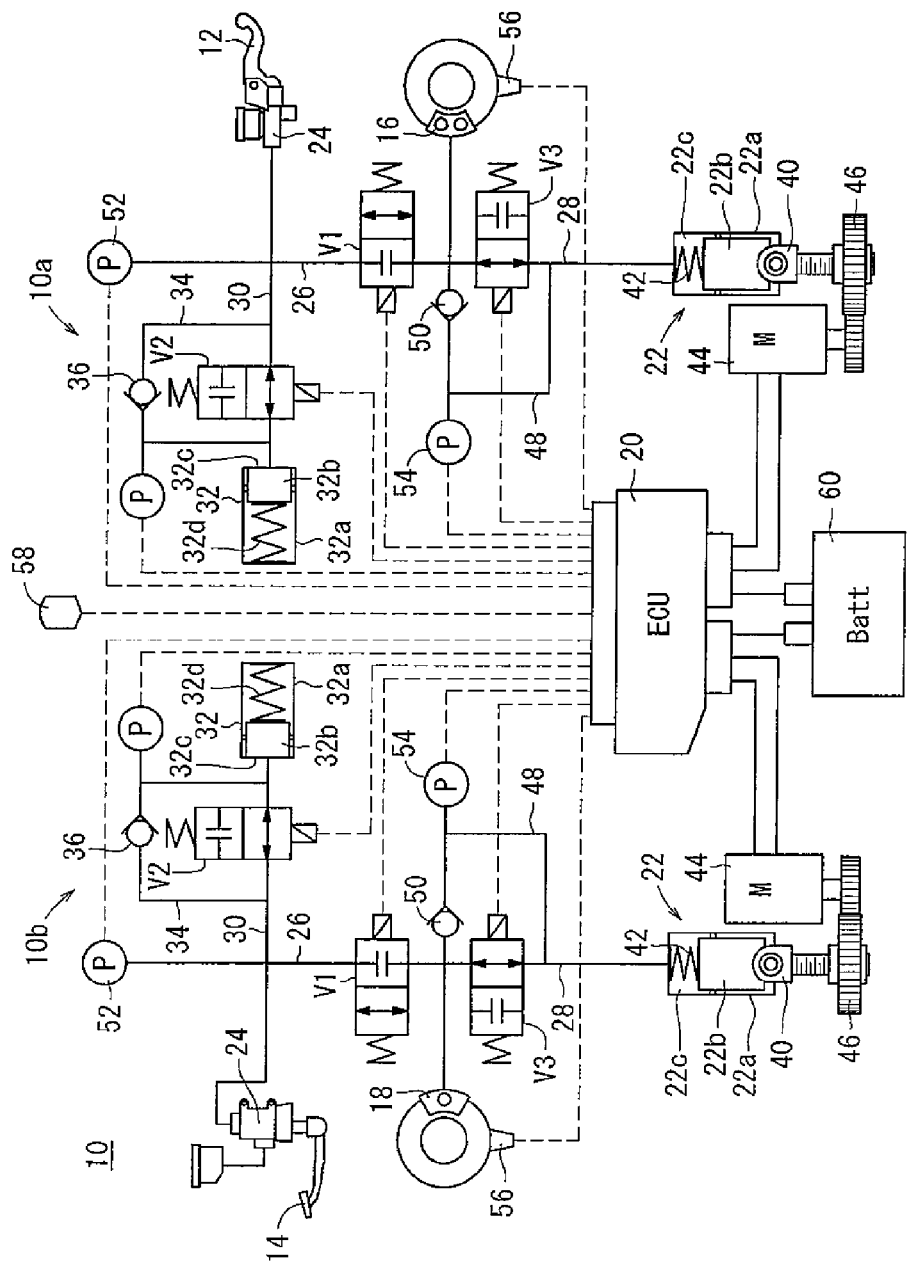
FIG. 1 is a circuit diagram showing the configuration of a braking device for a motorcycle according to an embodiment of the present invention.

FIG. 1 is a circuit diagram showing the configuration of a braking device 10 for a motorcycle according to an embodiment of the present invention. The braking device 10 for the motorcycle according to this embodiment (hereinafter referred to as "braking device 10") is mounted on various kinds of motorcycles such as so-called super sports motorcycles, and serves as a device for controlling the actuation of a front-wheel brake caliper 16 and a rear-wheel brake caliper 18 according to the operation by a rider of a brake lever 12 and a brake pedal 14 to apply a predetermined braking force to a vehicle.

As shown in FIG. 1, the braking device 10 is configured in such a manner that a front-wheel braking circuit 10a and a rear-wheel braking circuit 10b, which are independent of each other, are linked via an ECU (controller, control unit) 20.

According to the braking device 10, a brake operation for the front-wheel braking circuit 10a is performed by the brake lever 12 serving as a front-wheel brake operating unit, and a brake operation for the rear-wheel braking circuit 10b is performed by the brake pedal 14 serving as a rear-wheel brake operating unit. Except for this, the front-wheel braking circuit 10a and the rear-wheel braking circuit 10b have almost the same structure. Therefore, hereinafter, descriptions will be basically provided for the front-wheel braking circuit 10a. For the rear-wheel braking circuit 10b, overlapped descriptions will be omitted by assigning the same reference signs to the same or like elements as those of the front-wheel braking circuit 10a.

The braking device 10 employs a by-wire system (brake-by-wire) for the front-wheel braking circuit 10a and the rear-wheel braking circuit 10b. That is to say, in the braking device 10, the manipulated variable (hydraulic pressure in this embodiment) of the brake lever 12 and the brake pedal 14 serving as the brake operating units is electrically detected, and then a predetermined braking force is generated on the front-wheel brake caliper 16 and the rear-wheel brake caliper 18 serving as brakes, using a hydraulic pressure created by a hydraulic pressure modulator 22, based on the detected value.

Also, the braking device 10 adopts an interlocking brake system (CBS) in which, when the brake operating unit on either of the front and rear wheels, for example, the brake pedal 14 serving as the rear-wheel brake operating unit is operated, the actuation of the front-wheel brake caliper 16 and the rear-wheel brake caliper 18, serving as the front-wheel brake and the rear-wheel brake, respectively, can be controlled in an interlocking manner under the control of the ECU 20. In concrete terms, when, for example, the brake pedal 14 is operated, in the rear-wheel braking circuit 10b, the actuation of the hydraulic pressure modulator 22 is controlled by the by-wire system, based on the hydraulic pressure in a master cylinder 24, under the control of the ECU 20 so as to allow a predetermined hydraulic pressure to act on the rear-wheel brake caliper 18, and in response thereto, the actuation of the hydraulic pressure modulator 22 in the front-wheel braking circuit 10a is also controlled so as to allow a predetermined hydraulic pressure to act also on the front-wheel brake caliper 16.

As shown in FIG. 1, in the front-wheel braking circuit 10a (the rear-wheel braking circuit 10b), the master cylinder 24 moving in response to the brake lever 12 (the brake pedal 14) serving as the brake operating unit, and the front-wheel brake caliper 16 (the rear-wheel brake caliper 18) corresponding to the master cylinder 24 are connected through a main passage 26. At a point of the main passage 26, the hydraulic pressure modulator 22 is merged and connected with the main passage 26 through a supply-discharge passage 28.

In the main passage 26, toward the master cylinder 24 from the portion where the main passage 26 and the supply-discharge passage 28 are merged and connected with each other, there is interposed between the master cylinder 24 and the front-wheel brake caliper 16 a first electromagnetic on-off valve V1 of a normally open type allowing the master cylinder 24 and the front-wheel brake caliper 16 to communicate with each other or being isolated from each other.

In addition, a branch passage 30 is connected to the main passage 26. A hydraulic loss simulator 32 is connected to the branch passage 30 through a second electromagnetic on-off valve V2 of a normally closed type. The hydraulic loss simulator 32 has the function of causing, when the first electromagnetic on-off valve V1 closes the main passage 26 (in operation of the by-wire system as shown in FIG. 1), a pseudo hydraulic reaction force corresponding to a manipulated variable of the brake lever 12 to act on the master cylinder 24. When the reaction force is applied by the hydraulic loss simulator 32, the second electromagnetic on-off valve V2 opens the branch passage 30 to permit the communication between the side of the master cylinder 24 and the hydraulic loss simulator 32.

With respect to the hydraulic loss simulator 32, a piston 32b is housed in a cylinder 32a so that the piston 32b can freely move back and forth therein. A fluid chamber 32c for receiving operating fluid (brake fluid) flowing in from the master cylinder 24 is formed between the cylinder 32a and a front end surface of the piston 32b. On the back (back pressure side) of the piston 32b, there is provided a rebound spring 32d, for example, with a coil spring and a resin spring, which differ in properties from each other, arranged in series. The rebound spring 32d can apply a reaction force having the property of rising initially gently and then sharply at a stroke end, to the piston 32b, that is, to the operation of the brake lever 12 serving as the brake operating unit.

Also, the branch passage 30 is provided with a bypass passage 34 for bypassing the second electromagnetic on-off valve V2. The bypass passage 34 is provided with a check valve 36 which allows operating fluid to flow from the hydraulic loss simulator 32 toward the master cylinder 24.

The hydraulic pressure modulator 22 includes a cam mechanism 40 for pushing a piston 22b provided within a cylinder 22a toward a hydraulic pressure chamber 22c formed between the cylinder 22a and a front end surface of the piston 22b; a return spring 42 for always urging the piston 22b in the direction of the cam mechanism 40; and an electric motor 44 for operating the cam mechanism 40. The hydraulic pressure chamber 22c communicates with and is connected to the supply-discharge passage 28. This hydraulic pressure modulator 22, by actuating the cam mechanism 40 with the electric motor 44 through a gear mechanism 46, can push the piston 22b or return the piston 22b using the return spring 42, with an initial position of the cylinder 22a as the reference. In other words, the hydraulic pressure modulator 22 can increase or decrease the pressure (hydraulic pressure) in the hydraulic pressure chamber 22c so as to increase or decrease the braking pressure of the front-wheel brake caliper 16 (the rear-wheel brake caliper 18) serving as the brake.

The electric motor 44, for example, by adjusting a current value that is determined based on an input duty ratio (ON time/ON time+OFF time) under PWM control, can electrically, accurately, and easily adjust the position of the piston 22b that is determined by the rotational position of the cam mechanism 40 so as to adjust the pressure in the hydraulic pressure chamber 22c.

On the supply-discharge passage 28, a third electromagnetic on-off valve V3 of a normally closed type is disposed, and a bypass passage 48 for bypassing the third electromagnetic on-off valve V3 is provided. The bypass passage 48 is provided with a check valve 50 which allows operating fluid to flow from the hydraulic pressure modulator 22 toward the front-wheel brake caliper 16 serving as the brake.

In the front-wheel braking circuit 10a (the rear-wheel braking circuit 10b), a pressure sensor (P) 52 is provided on the input side which corresponds to the side of the master cylinder 24 across the first electromagnetic on-off valve V1, and a pressure sensor (P) 54 is also provided on the output side which corresponds to the side of the front-wheel brake caliper 16 across the first electromagnetic on-off valve V1. Also, a cam shaft (not shown) of the cam mechanism 40 is provided with an angle sensor (not shown) for use in angle information feedback, and a wheel speed sensor 56 for detecting wheel speed is provided in the vicinity of the front-wheel brake caliper 16.

The braking device 10 is provided with a mode selection switch 58 which allows a rider to select a control mode by a manual operation, and if the rider desires CBS control, the rider switches to select the CBS control. The following description is based on the case where the CBS control is selected.

The ECU 20 is a controller which receives power from a battery 60 to control the opening and closing of the first electromagnetic on-off valve V1, the second electromagnetic on-off valve V2, and the third electromagnetic on-off valve V3 based on the signals detected by the pressure sensors 52 and 54, the wheel speed sensor 56, the angle sensor and the like, and also controls the actuation of the electric motor 44 to operate the hydraulic pressure modulator 22 (signal lines are shown by dashed lines in FIG. 1).

Figure 2:
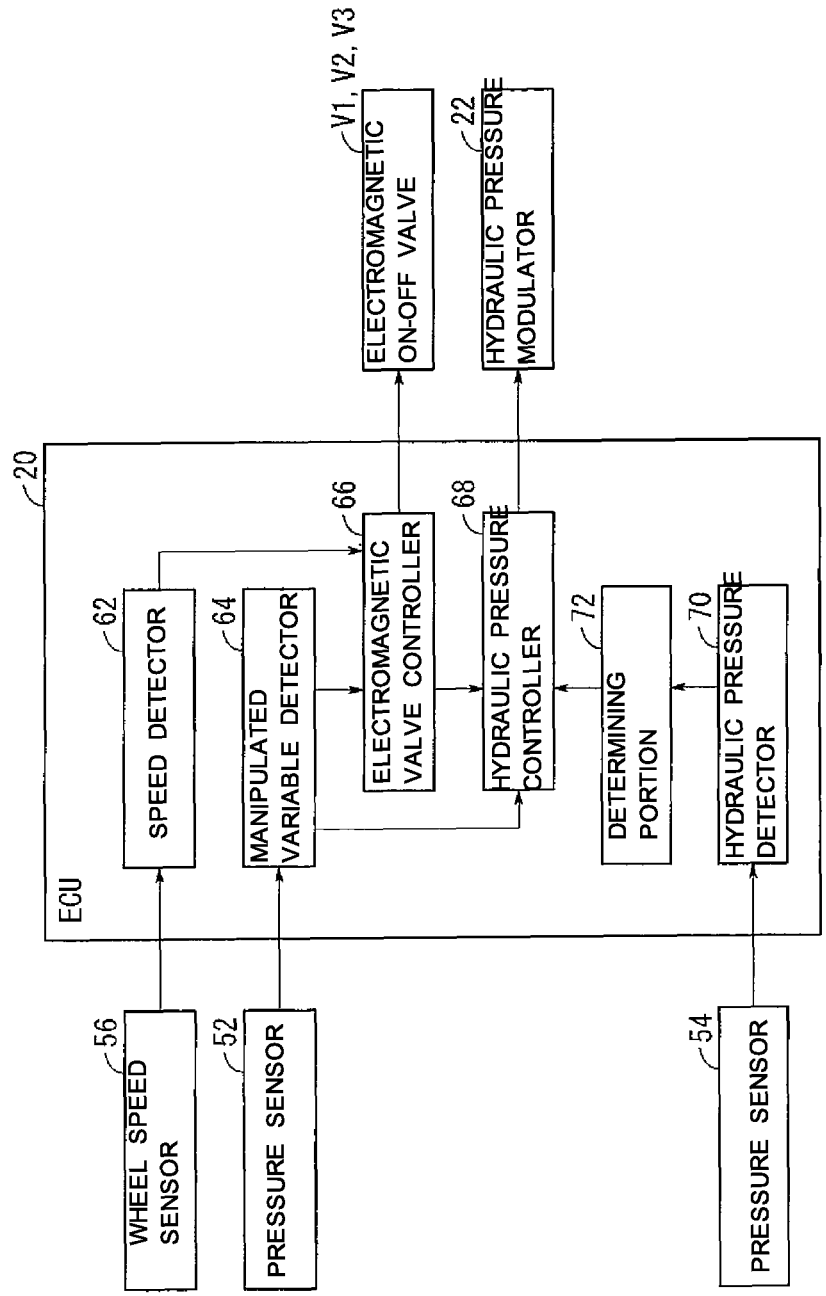
FIG. 2 is a block diagram showing the functions of an ECU for executing pressure rising rate filter control.

As shown in FIG. 2, the ECU 20 has the functions as a speed detector 62 for inputting a detection signal of the wheel speed sensor 56; a manipulated variable detector 64 for inputting a detection signal of the pressure sensor 52; an electromagnetic valve controller 66 for controlling the opening and closing of the first to third electromagnetic on-off valves V1 to V3; and a hydraulic pressure controller 68 for controlling the actuation of the hydraulic pressure modulator 22 (electric motor 44). The speed detector 62 receives the detection signal of the wheel speed sensor 56 at the time when one brake operating unit, for example, the brake pedal 14, is operated, and then detects the speed of the front and rear wheels at that time. The manipulated variable detector 64 receives the detection signal of the pressure sensor 52 at the time when the above-described one brake operating unit is operated, and then detects information (hydraulic pressure) such as a manipulated variable. The electromagnetic valve controller 66 controls the opening and closing of the first to third electromagnetic on-off valves V1 to V3 in both the front-wheel and rear-wheel braking circuits 10a and 10b as appropriate, based on the information detected by the speed detector 62, the manipulated variable detector 64 and the like. The hydraulic pressure controller 68 controls the actuation of the hydraulic pressure modulator 22 (electric motor 44) on each of the front and rear wheels as appropriate, based on basically the information detected by the manipulated variable detector 64.

Consequently, when operating the braking device 10 using the by-wire system, the ECU 20 receives, based on the operation of one brake operating unit, for example, the brake pedal 14, the speed of the front and rear wheels at that time and the information such as a manipulated variable of braking from the wheel speed sensor 56 and the pressure sensor 52 through the speed detector 62 and the manipulated variable detector 64, respectively; controls the opening and closing of the first to third electromagnetic on-off valves V1 to V3 as appropriate through the electromagnetic valve controller 66; and also controls the actuation of the hydraulic pressure modulators 22 as appropriate through the hydraulic pressure controller 68. More specifically, the first electromagnetic on-off valve V1 in each of the braking circuits 10a and 10b is, in accordance with a command from the electromagnetic valve controller 66, kept in a position for closing the main passages 26 as shown in FIG. 1. At the same time, the second and third electromagnetic on-off valves V2 and V3 are kept in an open position. Furthermore, the hydraulic pressure controller 68 allows the respective hydraulic pressure modulators 22 to supply a hydraulic pressure corresponding to vehicle driving conditions and brake operations to the front-wheel brake caliper 16 and the rear-wheel brake caliper 18.

As shown in FIG. 2, the ECU 20 also has the functions as a hydraulic pressure detector 70 for inputting a detection signal of the pressure sensor 54; and a determining portion 72 for determining whether or not the value detected by the hydraulic pressure detector 70 is a predetermined value or more.

The hydraulic pressure detector 70 receives the detection signal of the pressure sensor 54 to detect caliper pressure (brake fluid pressure) applied to the front-wheel brake caliper 16 and the rear-wheel brake caliper 18. The determining portion 72 determines whether or not the value detected by the hydraulic pressure detector 70, that is, the hydraulic pressure detected by the pressure sensor 54 is a predetermined value or more (a predetermined rising rate or more) to output a result of the determination to the hydraulic pressure controller 68. Therefore, the hydraulic pressure controller 68 has, in addition to the above-described basic function of controlling the actuation of the hydraulic pressure modulators 22 based on the information detected by the manipulated variable detector 64, the function of controlling the actuation of the hydraulic pressure modulators 22 when it is determined by the determining portion 72 that the detected value is a predetermined value or more (a predetermined rising rate or more) so as to change and control, as appropriate, the hydraulic pressure to be applied to the front-wheel brake caliper 16 and the rear-wheel brake caliper 18.

Next, a control method and operational advantages of the braking device 10 for the motorcycle according to this embodiment basically having the above-described structure will be described.

First, normal interlocking brake control, in the case where the brake pedal 14 is gently and carefully operated, in the braking device 10, will be described with reference to FIGS. 3A and 3B.

Figure 3A:
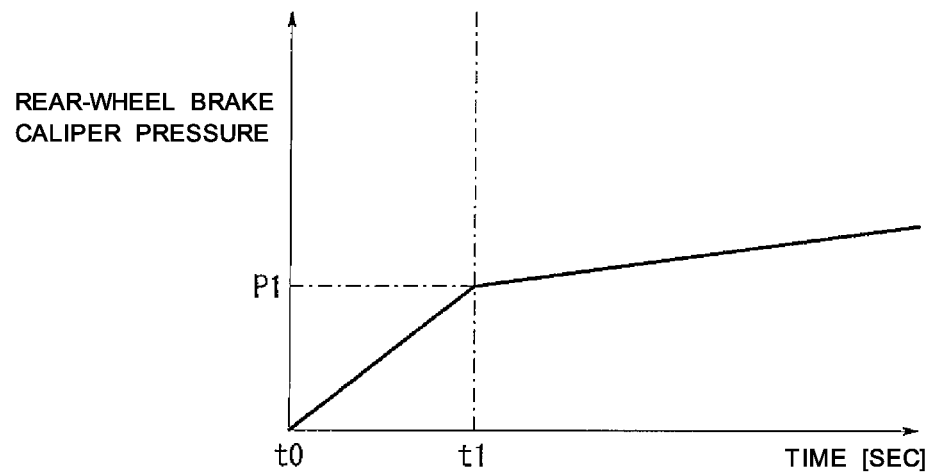
FIG. 3A illustrates changes with time in hydraulic pressure of a rear-wheel brake caliper applied by a rear-wheel hydraulic pressure modulator.
Figure 3B:
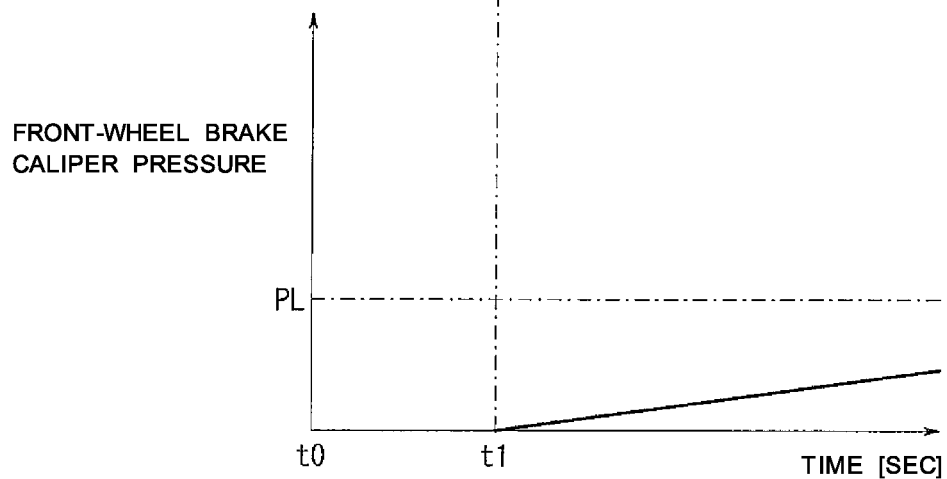
FIG. 3B illustrates changes with time in hydraulic pressure of a front-wheel brake caliper applied by a front-wheel hydraulic pressure modulator actuated in response to the rear-wheel side.

FIGS. 3A and 3B are graphs showing a state of the brake operation by the CBS control in the case where only the brake pedal 14 serving as the rear-wheel brake operating unit is operated. FIG. 3A illustrates changes with time in hydraulic pressure (rear-wheel brake caliper pressure) of the rear-wheel brake caliper 18 applied by the rear-wheel hydraulic pressure modulator 22; and FIG. 3B illustrates changes with time in hydraulic pressure (front-wheel brake caliper pressure) of the front-wheel brake caliper 16 applied by the front-wheel hydraulic pressure modulator 22 that is actuated in response to the rear-wheel side.

When a rider operates the brake pedal 14 serving as the rear-wheel brake operating unit to perform a predetermined decelerating during vehicle operation, the first electromagnetic on-off valve V1 is closed and the second and third electromagnetic on-off valves V2 and V3 are opened in the rear-wheel braking circuit 10b, by electronic control using the ECU 20, as shown in FIG. 1. Thus, the main passage 26 is isolated from the master cylinder 24 by closing of the first electromagnetic on-off valve V1, and at the same time, the branch passage 30 and the main passage 26 bring the master cylinder 24 and the hydraulic loss simulator 32 into conduction by opening of the second electromagnetic on-off valve V2. Furthermore, the supply-discharge passage 28 and the main passage 26 bring the hydraulic pressure modulator 22 and the rear-wheel brake caliper 18 into conduction by opening of the third electromagnetic on-off valve V3, thereby allowing braking using the by-wire system. At the same time, also in the front-wheel braking circuit 10a, the first electromagnetic on-off valve V1 is closed, and the second and third electromagnetic on-off valves V2 and V3 are opened, thereby allowing braking using the by-wire system, in the same manner as in the rear-wheel braking circuit 10b described above.

Then, a manipulated variable of the brake pedal 14 is detected from the pressure sensor 52 of the rear-wheel braking circuit 10b through the manipulated variable detector 64, and the actuation of the hydraulic pressure modulator 22 on the rear wheel is controlled by the hydraulic pressure controller 68. Thus, a predetermined hydraulic pressure is applied to the rear-wheel brake caliper 18 as shown after time point t0 in FIG. 3A, and the rear-wheel brake caliper pressure rises following the operation of the brake pedal 14.

Subsequently, when, based on a braking force distribution for the front and rear wheels preset by the braking device 10, it is determined by the determining portion 72 that the rear-wheel brake caliper pressure detected by the pressure sensor 54 and the hydraulic pressure detector 70 exceeds a predetermined value P1 (time point t1 in FIG. 3A), the hydraulic pressure controller 68 controls to actuate the hydraulic pressure modulator 22 on the front-wheel. Thus, a predetermined hydraulic pressure (front-wheel brake caliper pressure) is also applied to the front-wheel brake caliper 16 (time point t1 in FIG. 3B), and the front-wheel brake caliper pressure is controlled to rise at a predetermined rising rate.

Here, as shown in FIG. 3A, the rear-wheel brake caliper pressure after time point t1 at which the front and rear wheels are braked in an interlocking manner, is controlled to be set to an rising rate lower than the rising rate from the start of brake operation until predetermined value P1.

Commonly, on sports motorcycles, in particular, so-called super sports motorcycles, a rear-wheel brake is used chiefly for speed adjustment in corners. This is because if a front-wheel brake is also applied simultaneously with the operation of the brake pedal 14, strong brakes are applied to a vehicle, which might lead to decelerating unintended by a rider. On the other hand, when the rider strongly depresses the brake pedal 14, it is determined that the rider intends to stop the vehicle, rather than to adjust the speed. In that case, therefore, in order to apply a strong braking force to the vehicle, in the braking device 10, the CBS control for actuating the front-wheel brake in response to the rear-wheel brake is executed (see time point t1 of FIGS. 3A and 3B). At the same time, in order to provide an ideal distribution of braking forces to the front and rear wheels, the rear-wheel brake caliper pressure is set to reduce its rising rate, as shown after time point t1 in FIG. 3A.

In general, the brake pedal 14 serving as the rear-wheel brake operating unit is operated by pushing with rider's foot using ankle movement. Therefore, in the case of a motor-cycle, such as a super sports motorcycle, on which a rider rides with his/her head bent forward, since larger ankle movement is required as an operational load increases, delicate control may be difficult. More particularly, in the case where a vehicle is subjected to disturbance on a rough road or the like, a rider himself/herself might unintentionally, strongly depress the brake pedal 14. In such circumstances, the braking behavior is caused that is different from the case where the brake pedal 14 is gently operated (see FIGS. 3A and 3B). That is to say, when the rear-wheel brake caliper pressure rises sharply and exceeds a predetermined value P1 (see FIG. 3A) by an abrupt operation of the brake pedal 14 or the like, the front-wheel brake is applied in response thereto. Therefore, a smooth braking operation feeling might be unobtainable.

In the braking device 10 according to this embodiment, therefore, the control for properly controlling the braking operation by restricting the rising rate of the front-wheel brake caliper pressure (hereinafter, referred to as "pressure rising rate filter control (hydraulic pressure rising rate restriction control)") is executed.

Figure 4A:
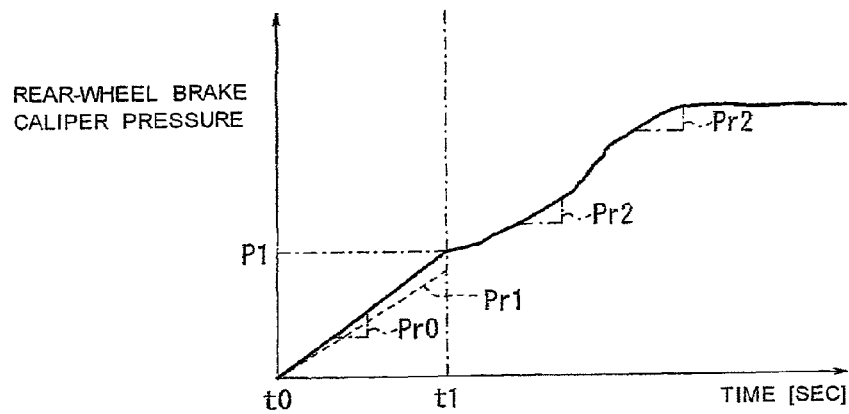
FIG. 4A illustrates changes with time in hydraulic pressure of the rear-wheel brake caliper applied by the rear-wheel hydraulic pressure modulator when executing pressure rising rate filter control.
Figure 4B:
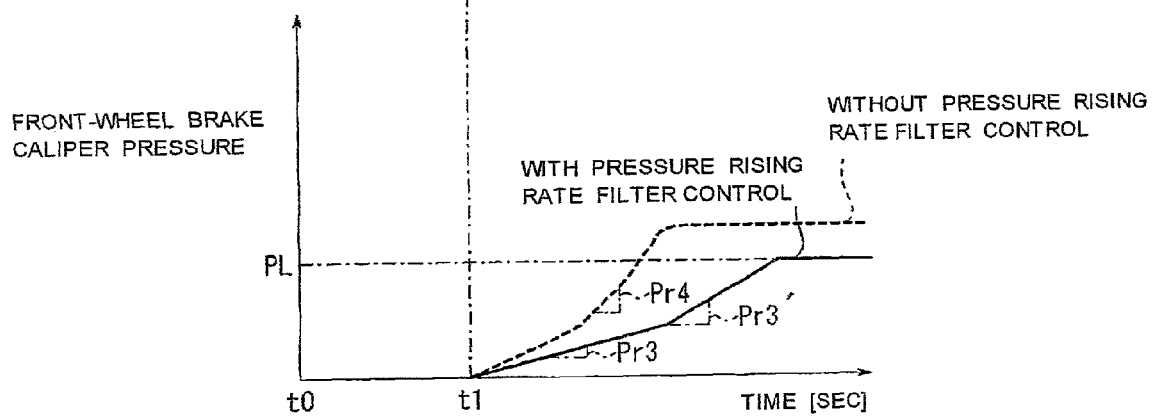
FIG. 4B illustrates changes with time in hydraulic pressure of the front-wheel brake caliper applied by the front-wheel hydraulic pressure modulator actuated in response to the rear-wheel side.

FIGS. 4A and 4B are graphs showing the braking operation states in the case where the pressure rising rate filter control is executed. FIG. 4A illustrates changes with time in hydraulic pressure (rear-wheel brake caliper pressure) of the rear-wheel brake caliper 18 applied by the rear-wheel hydraulic pressure modulator 22. FIG. 4B illustrates changes with time in hydraulic pressure (front-wheel brake caliper pressure) of the front-wheel brake caliper 16 applied by the front-wheel hydraulic pressure modulator 22 actuated in response to the rear-wheel side.

When a rider operates the brake pedal 14 serving as the rear-wheel brake operating unit to perform a predetermined decelerating during vehicle operation, the braking circuits 10a and 10b are put in operating conditions using the by-wire system, by electronic control using the ECU 20, as shown in FIG. 1, in the same manner as the above-described normal interlocking brake control.

Then, a manipulated variable of the brake pedal 14 is detected from the pressure sensor 52 of the rear-wheel braking circuit 10b through the manipulated variable detector 64, and the actuation of the hydraulic pressure modulator 22 on the rear wheel is controlled by the hydraulic pressure controller 68. Thus, a predetermined hydraulic pressure is applied to the rear-wheel brake caliper 18 (after time point t0 in FIG. 4A), and the rear-wheel brake caliper pressure rises following the operation of the brake pedal 14.

At this time, in the ECU 20, the hydraulic pressure detector 70 continually detects, from the pressure sensor 54 of the rear-wheel braking circuit 10b, the rear-wheel brake caliper pressure during the period from time point t0 to time point t1 in FIG. 4A. Also, the determining portion 72 receives the value detected by the hydraulic pressure detector 70 to calculate rising rate Pr0 (MPa/sec) of the rear-wheel brake caliper pressure before the start of interlocking brake operation (during the period from time point t0 to time point t1 in FIG. 4A) and determine whether or not the rising rate Pr0 is predetermined value Pr1 (predetermined rising rate Pr1) (see the dashed line of FIG. 4A) or more. At this time, the determining portion 72 also determines, through the pressure sensor 54 and the hydraulic pressure detector 70, whether or not the rear-wheel brake caliper pressure exceeds a predetermined value P1 (see FIG. 4A). When the rear-wheel brake caliper pressure exceeds a predetermined value P1, the CBS control is executed by the hydraulic pressure controller 68, in the same manner as the case shown in FIGS. 3A and 3B.

For example, in the case where a rider unintentionally performs an abrupt operation of brake pedal 14, that is, in the case where it is determined by the determining portion 72 that the rising rate Pr0 is predetermined value Pr1 or more (Pr0≥Pr1), and also when the rear-wheel brake caliper pressure exceeds a predetermined value P1 (see time point t1 of FIG. 4A), with respect to the CBS control of the front-wheel and rear-wheel brakes after time point t1, the hydraulic pressure controller 68 firstly changes the rising rate of the rear-wheel brake caliper pressure to rising rate Pr2 with a value lower than rising rate Pr0 as shown in FIG. 4A, and then controls the actuation of the hydraulic pressure modulator 22 on the rear wheel. In that case, since the brake pedal 14 is subjected to an abrupt operation, the rear-wheel brake caliper pressure tends to show the behavior with slight fluctuations as shown after time point t1 in FIG. 4A. However, lower rising rate Pr2 after changing as described above prevents excessively-strong braking.

At the same time, as shown by the solid line after time point t1 in FIG. 4B, the hydraulic pressure controller 68 sets the front-wheel brake caliper pressure to further lower rising rates Pr3, Pr3', based on the rising rate Pr2 of the rear-wheel brake caliper pressure after changing as described above, and controls the actuation of the hydraulic pressure modulator 22 on the front wheel. Here, rising rates Pr3, Pr3' (see FIG. 4B)of the front-wheel caliper pressure is set to be lower than the rising Pr2 (see FIG. 4A) of the rear-wheel brake caliper pressure. In this manner, the front-wheel brake caliper pressure is controlled to rise at the moderately-reduced rising rates Pr3, Pr3', and therefore, a more smooth brake operation feeling is obtainable, and brake control performance is also improved.

In other words, in the braking device 10, in the case of the normal brake control (see FIGS. 3A and 3B) in which the brake pedal 14 is gently operated, the front-wheel brake caliper pressure is controlled to rise at approximately the same rising rate as that of the rear-wheel brake caliper pressure, thereby applying a proper braking force to the vehicle. On the other hand, if no pressure rising rate filter control is executed in the case where the brake pedal 14 is sharply operated, the front-wheel brake caliper pressure is controlled to rise at rising rate Pr4 (see the graph shown by the dashed line after time point t1 in FIG. 4B) which is approximately the same as rising rate Pr2 of the rear-wheel brake caliper pressure as shown in FIG. 4A. In that case, a smooth braking operation feeling might be unobtainable.

In the braking device 10, therefore, in the case where the brake pedal 14 is sharply operated or the like, the front-wheel brake caliper pressure is set to rising rates Pr3, Pr3' (see the graph shown by the solid line after time point t1 in FIG. 4B) lower than rising rate Pr4 (see the graph shown by the dashed line in FIG. 4B) which is approximately the same as the rising rate Pr2 of the rear-wheel (see FIG. 4A) brake caliper pressure, and is controlled to rise. That is to say, the pressure rising of the front-wheel brake caliper 16 is controlled at the lower rising rate relative to the rising rate of the rear-wheel brake caliper pressure to thereby restrict the rising rates Pr3, Pr3' (see FIG. 4B) of the front-wheel brake caliper pressure so that the front-wheel brake caliper pressure can moderately rise. Therefore, according to the braking device 10, brake control performance and operational performance of the brake pedal 14 is improved. It should be noted that rising rates Pr3, Pr3' of the front-wheel brake caliper pressure set based on rising rate Pr2 of the rear-wheel brake caliper pressure may be preset as, for example, a function or map (table) of the relationship between rising rates Pr3, Pr3' and rising rate Pr2 to be stored in the ECU 20. This allows the reduction of arithmetic processing by the ECU 20 and more smooth control of the front-wheel brake caliper pressure.

Furthermore, the braking device 10 with the above-described pressure rising rate filter control may be mounted on various kinds of motorcycles by only changing the settings of control programs of the ECU 20 (or alternatively, a separate memory and the like) without changing specifications (such as a master cylinder or pedal ratio) for an input mechanism of a brake pedal, or specifications for various kinds of brake parts, which previously required the settings depending on the type of vehicle. Thus, the braking device 10, which is simple and has great versatility, can readily respond to differences in product models, changes in specifications or the like by only changing to optimize control specification, and also allows the reduction in setting man-hours and in costs for mounting.

As shown in FIG. 4B, in this pressure rising rate filter control, for example, under the setting control of the hydraulic pressure controller 68, the front-wheel brake caliper pressure is preferably controlled to rise so as not to exceed a front-wheel lock hydraulic pressure PL to lock the front wheel, thereby allowing minimization of wheel locking and further improvement in the braking control performance. In this case, the front-wheel lock hydraulic pressure PL, by detecting a front-wheel locking state, for example, based on a detection value of the wheel speed sensor 56, is preferably set in accordance with the front-wheel brake caliper pressure in that state, thereby allowing control of the front-wheel brake caliper pressure more suitable for a vehicle state during braking.

In addition, the above description illustrates the pressure rising rate filter control in which the front-wheel brake caliper pressure applied in response to the rear-wheel side is set to further reduced rising rates Pr3, Pr3' (see FIG. 4B) when rising rate Pr0 of the rear-wheel brake caliper pressure during the period from time point t0 to time point t1 of FIG. 4A is predetermined value Pr1 or more. However, the control method may be employed in which, for example, during interlocking brake operation, restrictions are always put on the rising rate of the front-wheel brake caliper pressure applied in response to the rear-wheel side, irrespective of a value of the above-described rising rate Pr0. In that case, when the brake pedal 14 is gently operated (see FIGS. 3A and 3B), the rising rate of the front-wheel brake caliper pressure tends to be slightly reduced. However, since the rising rate of the front-wheel brake caliper pressure is originally set to a lower value at the time of the gentle pedal operation, such reduction is small in amount. Also, a rider normally intends to carry out gentle decelerating, and therefore the lack of a braking force applied to the vehicle can be avoided.

It should be understood that the present invention is not limited to the above-described embodiment, and various configurations or processes can be adopted without departing from the scope of the invention.

The rear-wheel brake operating unit may include forms, such as lever-type forms, other than the brake pedal 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A braking device for a motorcycle allowing interlocking control of a rear-wheel brake and a front-wheel brake based on an operation of a rear-wheel brake operating unit, comprising:
   a first pressure sensor on an output side of a caliper of the rear-wheel brake;
   a second pressure sensor on an output side of the rear-wheel brake operating unit;
   an electronic control unit (ECU) which includes:
   a manipulated variable detector for receiving a detection signal from the second pressure sensor;
   an electromagnetic valve controller for controlling an opening and a closing of on-off valves of the braking device;
   a hydraulic pressure detector for detecting a rear-wheel brake caliper pressure from the first pressure sensor caused by the operation of the rear-wheel brake operating unit;
   a determining portion; and
   a hydraulic pressure controller,
   wherein when an unintentional operation of the rear-wheel brake operating unit is performed, which causes the determining portion to determine that a first rising rate (Pr0) is either equal to a first predetermined value (Pr1) or is more than the first predetermined value (Pr1), and also causes a rear-wheel brake caliper pressure to exceed a predetermined value (P1) at a time point (t1) with respect to a control of the front-wheel and rear-wheel brakes after the time point (t1), and
   causes the hydraulic pressure controller to change the first rising rate (Pr0) of the rear-wheel brake caliper pressure to a second rising rate (Pr2) which is a value lower than the first rising rate (Pr0), and then controls actuation of a hydraulic pressure modulator on a rear wheel, which causes the rear-wheel brake caliper pressure to show a behavior with fluctuations after the time point (t1), and
   causes a front-wheel brake caliper pressure to rise, after the time point (t1), at third rising rates (Pr3, Pr3') which are lower relative to a fourth rising rate (Pr4) of the front-wheel brake caliper pressure which would result if there were no pressure rising rate filter control of the front-wheel brake caliper pressure,
   thereby improving a brake control performance and an operational performance of the rear-wheel brake operating unit.

2. The braking device for the motorcycle according to claim 1, wherein the hydraulic pressure controller is adapted to control the front-wheel brake caliper pressure in such a manner that the front-wheel brake caliper pressure does not exceed a front-wheel lock hydraulic pressure.

3. The braking device for the motorcycle according to claim 2, wherein a front-wheel locking state is detected by a wheel speed sensor, and the front-wheel lock hydraulic pressure is set according to the front-wheel brake caliper pressure.

4. The braking device for the motorcycle according to claim 1, wherein the rear-wheel brake operating unit is a brake pedal.

5. The braking device for the motorcycle according to claim 2, wherein the rear-wheel brake operating unit is a brake pedal.

6. The braking device for the motorcycle according to claim 3, wherein the rear-wheel brake operating unit is a brake pedal.

7. A braking device for a motorcycle allowing interlocking control comprising:
   a rear-wheel brake adapted to be operatively connected to a rear-wheel;
   a front-wheel brake adapted to be operatively connected to a front-wheel;
   a rear-wheel operating unit operatively connected to the rear-wheel for providing interlocking control of said rear-wheel brake and said front-wheel brake based on an operation of the rear-wheel brake operating unit;
   a first pressure sensor on an output side of a caliper of the rear-wheel brake;
   a second pressure sensor on an output side of the rear-wheel brake operating unit;
   an electronic control unit (ECU) which includes:
   a manipulated variable detector for receiving a detection signal from the second pressure sensor;
   an electromagnetic valve controller for controlling an opening and a closing of on-off valves of the braking device;
   a hydraulic pressure detector for detecting a rear-wheel brake caliper pressure from the first pressure sensor caused by the operation of the rear-wheel brake operating unit;
   a determining portion; and
   a hydraulic pressure controller,
   wherein when an unintentional operation of the rear-wheel brake operating unit is performed, which causes the determining portion to determine that a first rising rate (Pr0) is either equal to a first predetermined value (Pr1) or is more than the first predetermined value (Pr1), and also causes the rear-wheel brake caliper pressure to exceed a predetermined value (P1) at a time point (t1) with respect to a control of the front-wheel and rear-wheel brakes after the time point (t1), and
   causes the hydraulic pressure controller to change the first rising rate (Pr0) of the rear-wheel brake caliper pressure to a second rising rate (Pr2) which is a value lower than the first rising rate (PT0), and then controls actuation of a hydraulic pressure modulator on a rear wheel, which causes the rear-wheel brake caliper pressure to show a behavior with fluctuations after the time point (t1), and
   causes a front-wheel brake caliper pressure to rise, after the time point (t1), at third rising rates (Pr3, Pr3') which are lower relative to a fourth rising rate (Pr4) of the front-wheel brake caliper pressure which would result if there were no pressure rising rate filter control of the front-wheel brake caliper pressure,
   thereby improving a brake control performance and an operational performance of the rear-wheel brake operating unit.

8. The braking device for the motorcycle according to claim 7, wherein the hydraulic pressure controller controls the front-wheel brake caliper pressure in such a manner that the front-wheel brake caliper pressure does not exceed a front-wheel lock hydraulic pressure.

9. The braking device for the motorcycle according to claim 8, wherein a front-wheel locking state is detected by a wheel speed sensor, and the front-wheel lock hydraulic pressure is set according to the front-wheel brake caliper pressure.

10. The braking device for the motorcycle according to claim 7, wherein the rear-wheel brake operating unit is a brake pedal.

11. A braking device for rear and front wheels a motorcycle allowing interlocking control comprising:
    a rear-wheel brake;
    a front-wheel brake;
    a rear-wheel operating unit operatively connected to the rear-wheel for providing interlocking control of said rear-wheel brake and said front-wheel brake based on an operation of the rear-wheel brake operating unit;
    a first pressure sensor on an output side of a caliper of the rear-wheel brake;
    a second pressure sensor on an output side of the rear-wheel brake operating unit;
    an electronic control unit (ECU) which includes:
    a manipulated variable detector for receiving a detection signal from the second pressure sensor;
    an electromagnetic valve controller for controlling an opening and a closing of on-off valves of the braking device;
    a hydraulic pressure detector for detecting a rear-wheel brake caliper pressure from the first pressure sensor caused by the operation of the rear-wheel brake operating unit;
    a determining portion; and
    a hydraulic pressure controller,
    wherein when an unintentional operation of the rear-wheel brake operating unit is performed, which causes the determining portion to determine that a first rising rate (Pr0) is either equal to a first predetermined value (Pr1) or is more than the first predetermined value (Pr1), and also causes the rear-wheel brake caliper pressure to exceed a predetermined value (P1) at a time point (t1) with respect to a control of the front-wheel and rear-wheel brakes after the time point (t1), and
    causes the hydraulic pressure controller to change the first rising rate (Pr0) of the rear-wheel brake caliper pressure to a second rising rate (Pr2) which is a value lower than the first rising rate (Pr0), and then controls actuation of a hydraulic pressure modulator on a rear wheel, which causes the rear-wheel brake caliper pressure to show a behavior with fluctuations after the time point (t1), and
    causes a front-wheel brake caliper pressure to rise, after the time point (t1), at third rising rates (Pr3, Pr3') which are lower relative to a fourth rising rate (Pr4) of the front-wheel brake caliper pressure which would result if there were no pressure rising rate filter control of the front-wheel brake caliper pressure,
    thereby improving a brake control performance and an operational performance of the rear-wheel brake operating unit,
    wherein the first rising rate (PT0) of the rear-wheel brake caliper pressure is prestored as a function or a map.

* * * * *